Figure 8:
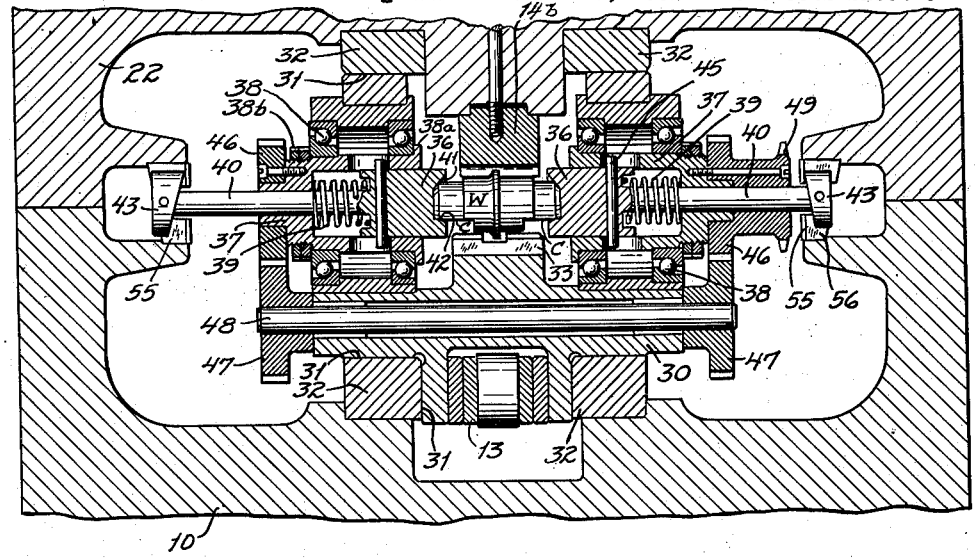

July 27, 1937.  B. P. SCHILTZ  2,088,119
METHOD OF MACHINING METALLIC WORKPIECES
Original Filed Nov. 9, 1932   3 Sheets—Sheet 1
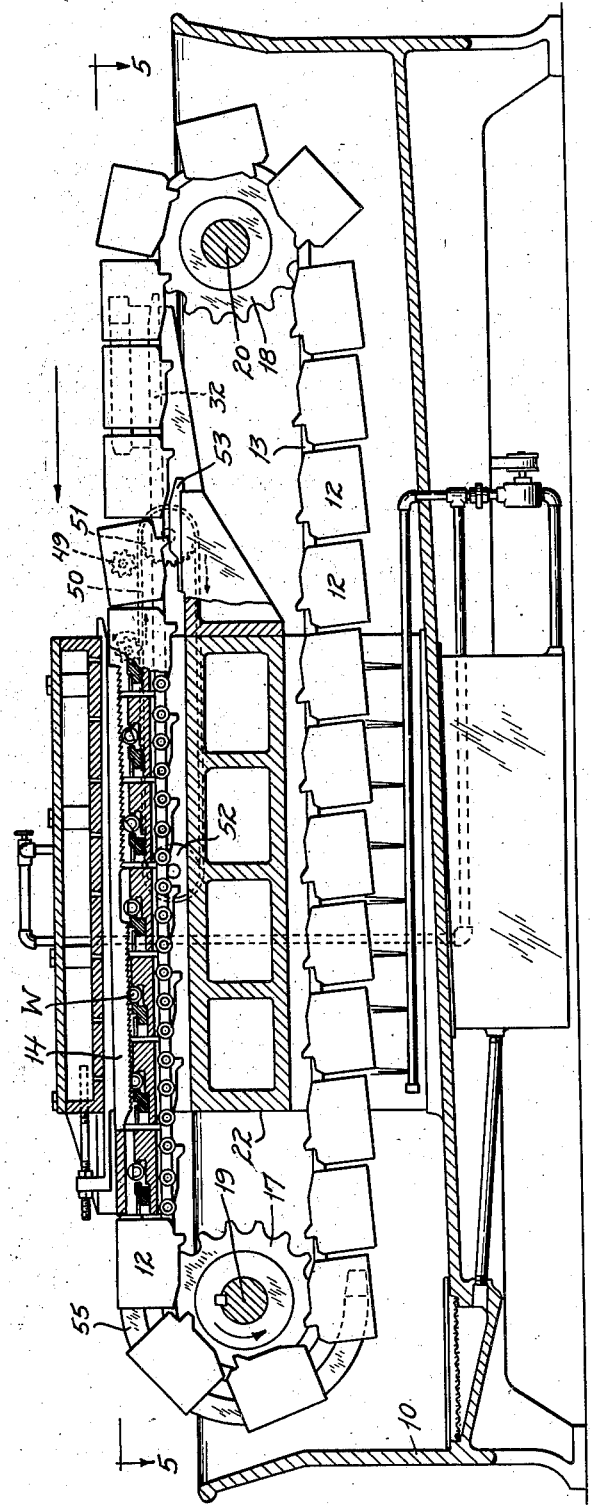
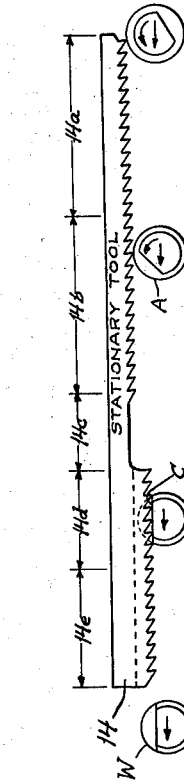
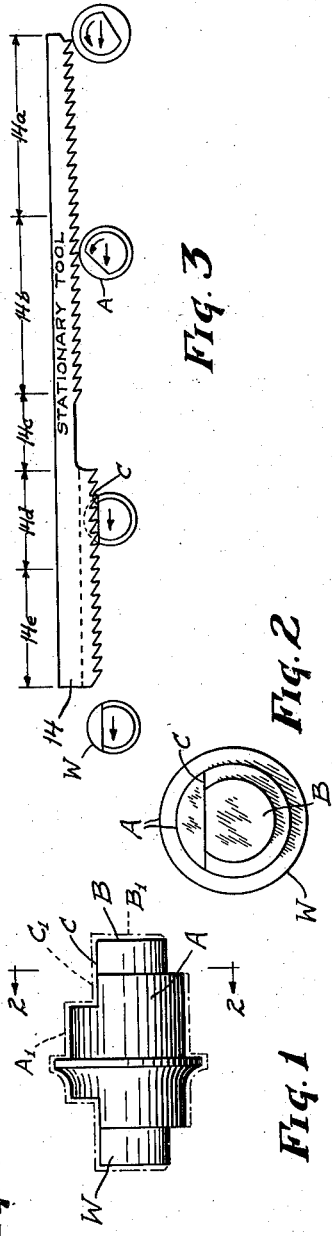
INVENTOR.
BY *Bernard P. Schiltz*
*Bates, Goldrick & Teare*
ATTORNEYS July 27, 1937.　　　　　B. P. SCHILTZ　　　　　2,088,119
METHOD OF MACHINING METALLIC WORKPIECES
Original Filed Nov. 9, 1932　　3 Sheets-Sheet 2
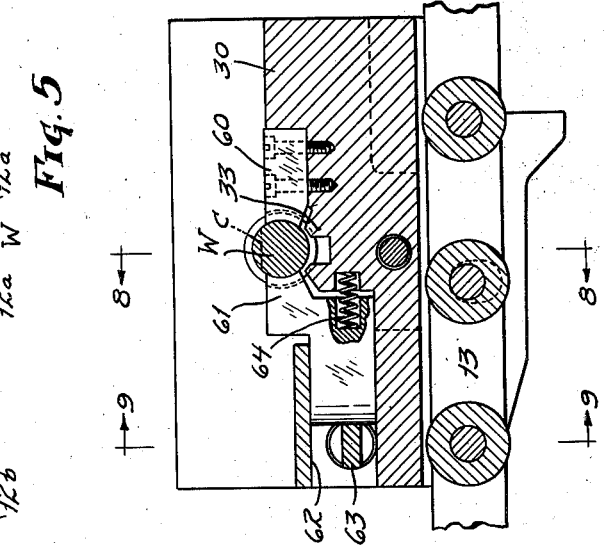
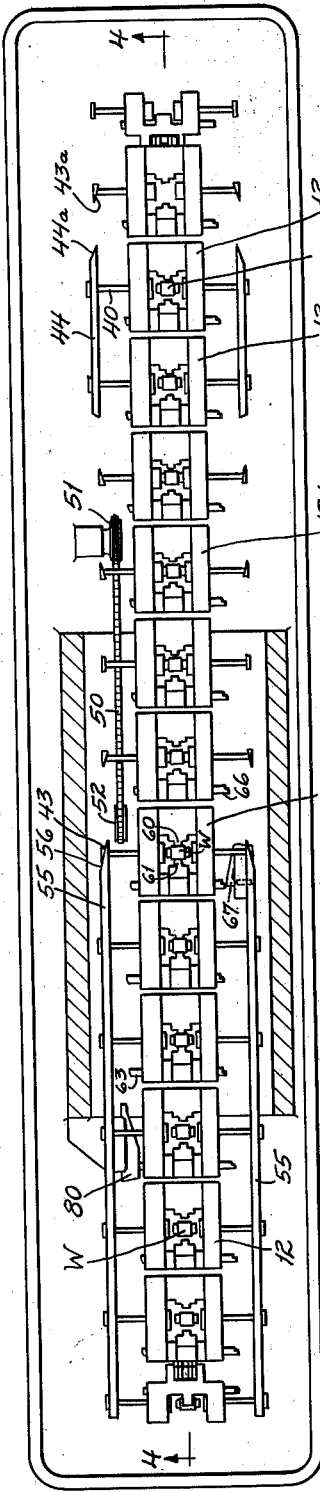
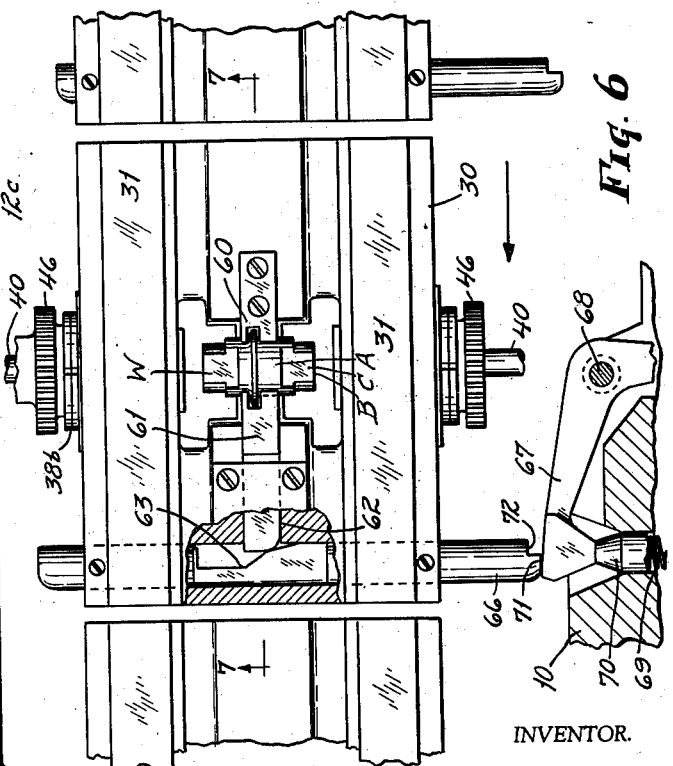
INVENTOR.
Bernard P. Schiltz
BY Bates, Golrick & Teare
ATTORNEYS.

INVENTOR.
BY Bernard P. Schiltz
Bates, Golrick & Teare
ATTORNEYS.

Patented July 27, 1937

2,088,119

UNITED STATES PATENT OFFICE 2,088,119

METHOD OF MACHINING METALLIC WORKPIECES

Bernard P. Schiltz, Cleveland, Ohio, assignor to The Foote-Burt Company, Cleveland, Ohio, a corporation of Ohio Original application November 9, 1932, Serial No. 641,851. Divided and this application March 5, 1936, Serial No. 67,239

7 Claims. (Cl. 29—1)

This invention relates to an improved method for effecting the machining of flat and turned surfaces on workpieces by imparting a relative linear movement between the work and a series of successive cutting edges.

The present application is a division of my copending application for Letters Patent, Serial No. 641,851, filed November 9th, 1932.

The general object of the present invention is to provide an improved method for effecting the rapid machining of pieces of work having both flat and turned surfaces.

A more specific object is to provide an improved method of machining workpieces which have both flat and turned circumferential surfaces, such as cylinders, having a flat surface parallel with or substantially parallel with its axis, the flat surface being previously located relative to the axis of the work.

Many workpieces are preformed by casting, forging or other well-known operations. Included among such workpieces are cylindrical pieces, having a flat side substantially parallel with their axes. Such workpieces are preformed, so as to eliminate as much machining as is consistent with good workmanship, and hence the flat sides or faces are preformed on the workpieces in casting or other similar operation.

My invention contemplates the effecting of the finishing of such a workpiece by moving the workpiece bodily along a definite path relative to a series of spaced cutting tools, and at the same time rotating the workpiece about its axis, and thereafter stopping the rotation of the workpiece with the preformed flat surface thereof accurately positioned relative to the tools without interrupting the relatively linear movement, thereby machining both the cylindrical and the flat surfaces of the work in one continuous movement of the work. Obviously, the flat surfaces may be machined before or after the machining of the cylindrical surface, or a rough cut made successively on both the cylindrical and flat surfaces, and thereafter a finishing cut made on such surfaces successively.

Other objects of the present invention will hereinafter become more apparent from the following description, reference being had to the accompanying drawings, in which I illustrate a preferred form of apparatus, for carrying out my improved method. The essential characteristics of the method will be summarized in the claims.

Figure 9:
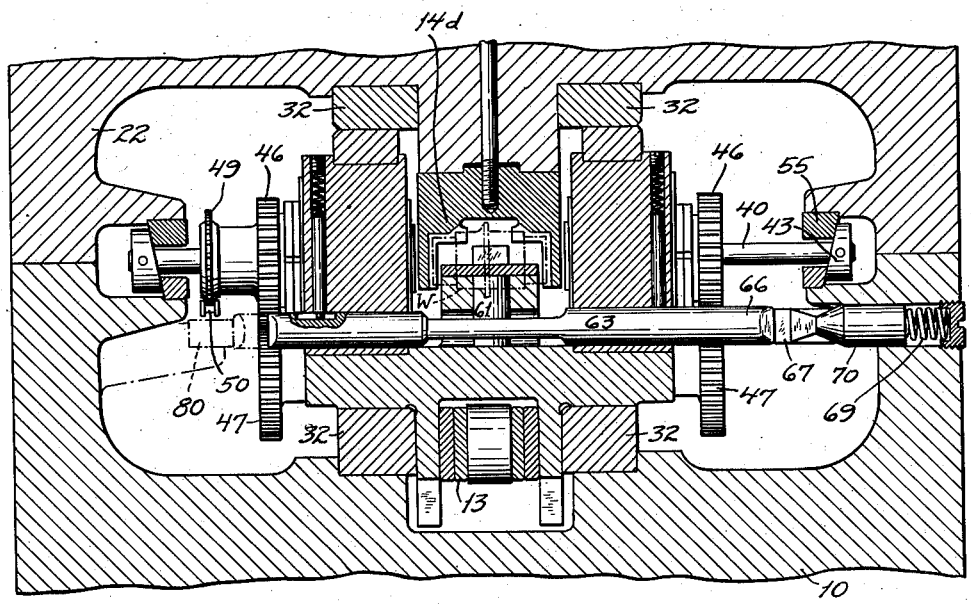

Referring now to the drawings, Fig. 1 illustrates a side elevation of one form of workpiece, which my method is well adapted to finish; Fig. 2 is a transverse section of such workpiece, as indicated by the line 2—2 on Fig. 1; Fig. 3 is a diagrammatic illustration of one way of carrying out my improved method; Fig. 4 is a substantially vertical section, through a machine adapted to carry out my improved method, the section being taken substantially along the line 4—4 of Fig. 5; Fig. 5 is a horizontal section of the machine illustrated in Fig. 4, the plane of the section being substantially that indicated by the lines 5—5 of Fig. 4; Fig. 6 is a detail, being a plan view of one of the workholders on an enlarged scale, together with certain of the operating mechanism therefor, which is carried by the frame of the machine, certain parts of the workholder being broken away to more clearly illustrate the internal construction thereof; Fig. 7 is a longitudinal section through the workholder, the plane of the section being indicated by the line 7—7 on Fig. 6; Figs. 8 and 9 are transverse sections through the workholder and the associated parts of the machine, the planes of the sections being indicated by the lines 8—8 and 9—9, respectively, on Fig. 7.

The mechanism illustrated in the drawings is fully illustrated, described and claimed in my copending application, heretofore mentioned, and is given here so that a more complete understanding of my improved method may be had. The machine, as will be noted from Figs. 3 and 4, comprises a main frame 10, in which I mount a series of workholders 12 in an endless chain formation.

The workholders are each provided with a spindle mechanism which serves to clamp the ends of a rough workpiece and rotate it to effect a cylindrical machine operation thereon, prior to the effecting of the straight-line cuts. Each workholder is also provided with a set of clamps, mechanically independent of the spindle clamps. These clamps serve to coact with part of the finished cylindrical surface of the work to clamp the work against rotation, in such a manner that the ends and other portions of the work may be disposed for presentation of the work to the cutting tools to effect a straight-line cut of the ends of the work and on the top thereof.

The workpiece, for which the mechanism illustrated in the drawings, is especially designed, is best illustrated in Figs. 1 and 2. As there shown, it will be noted that the work is provided with a cylindrical surface or surfaces A, straight-line end surfaces B, as well as a straight-line surface C, which extends substantially parallel with the axis of the workpiece. The workpiece, as illustrated in Fig. 1, is in its finished state. The dotted lines adjacent the surface of the workpiece indicate the same before the machining or finishing operation. It will be noted that the surfaces of the rough workpiece are substantially parallel with the corresponding surfaces of the finished piece.

In the drawings, and especially Figs. 3 and 4, I show a machine equipped with about thirty workholders 12, suitably connected to an endless chain 13, which is looped about sprockets 17 and 18, carried by suitable shafts 19 and 20, journalled in the main frame 10 of the machine. The fixture chain is preferably uninterruptedly driven from the shaft 19 in any suitable manner, such as by the usual motor and worm-gear speed reduction mechanism (not shown). A section 22 of the machine frame, and a cap secured thereto, embrace the upper reach of the workholders and are formed to comprise longitudinally extending slideways to provide a firm and rigid support for both the workholders and an open face type of elongated multiple tooth broaching bar 14, which overhangs the path of the workholders 12, as they are moved through the tunnel, formed by the section 22 of the frame, by their carrying chain.

The workholders or fixtures 12, each comprises a frame 30, having suitable machined surfaces 31, adapted to coact with guide rails 32 carried by the machine frame section 22, and thus retain the workholders against movement relative to the cutting tool 14, other than that caused by the progress of the workholders through the machine.

Each workholder is arranged to grip and support a workpiece while it is acted upon by the cutting tool. As illustrated in the drawings, and especially Figs. 6 to 9, inclusive, each workholder has a support 33 on which the operator may position a workpiece, without interrupting the progress of the workholder.

The progress of a workholder toward the tool 14 causes the work W to be clamped between a pair of chuck members 36. These chuck members are slidably mounted, to move toward the opposite ends of the workpiece in bushings 37, which are rotatably mounted in the workholder frame 30, as by suitable anti-friction bearings 38. The bearings 38 are prevented from axial movement relative to the workholder by an enlarged shoulder 38a and suitable lock nuts 38b, which engage the workholder, as shown in Fig. 8. The chucks are normally urged toward the work by suitable compression springs 39, which encircle axial stems 40 of respective chucks, and are interposed between the chucks and walls of the workholder.

The inner or work-engaging faces of the chucks are conical, as indicated at 41, in Fig. 8, but are each provided with a flat surface 42 to coact with the flat surface C of the work. However, the springs 39 are preferably of sufficient strength to cause chucks and work gripped therebetween to rotate as a unit, and to prevent relative rotary movement between the chucks and the work.

The chucks 36 are moved outwardly against the action of the compression springs 39 to permit insertion of the work in the workholders when they are in the position indicated by the workholders 12a of Fig. 5. As heretofore mentioned, each chuck 36 is provided with an axially extending stem 40. These stems project laterally through the side walls of the workholder, as indicated in Figs. 5 and 8, and are each provided, on their outermost end, with a cam 43. When the workholders, during their progress to the machine, approach the position indicated by the workholders 12a of Fig. 5, suitable cam rails 44 carried by the machine frame 10, engage the cams 43, and withdraw the chucks, thus enabling the positioning of the work by the operator.

The cams 43 and the cam rails 44 coact to position the chucks 36 with their flat surfaces 42 facing upwardly, so that they will align with the flat surfaces C of the work W, previously positioned in the workholder by the operator. The cams 43 and 44 both have bevelled surfaces 43a and 44a, respectively, which coact with each other as the workholders approach the cam 44, and cause the cam 43 to rotate until the surfaces 43a and 44a are parallel with each other, as shown in Fig. 9. Hence, the flat surfaces 42 of the chucks are definitely positioned relative to the workholder to initially grip the work. As the cams 43 and 44 pass out of engagement with each other, the springs 39 cause the chucks to grip and clamp the work therebetween.

Shortly before the workholders reach the cutting tools 14, the work is rotated. To this end, each chuck 36 is drivingly connected to its chuck sleeve 37 by a suitable pin and slot connection 45. Drivingly secured to each sleeve 37 is a pinion 46, which constantly meshes with respective gears 47 secured to a common shaft 48, which is journalled in the workholder W, thus insuring synchronous rotation of both chucks independent of the contact between such chucks and the work. One of the pinions 46, (as, for instance, the right-hand pinion in Fig. 8), is drivingly connected to a sprocket 49, which, when the workholder approaches the position shown by the workholder 12b of the Figs. 4 and 5, moves into contact with a driving chain 50. This driving chain is looped around a sprocket 51 and a pulley 52 mounted on suitable shafts carried by the machine frame 10.

Each workholder is preferably pivoted to the supporting chain 13 therefor, as indicated in Fig. 4, and when they approach the tool 14, they are engaged by a cam 53, which rocks them about their pivots and raises the driving sprockets 49 of the workholders to enable them to clear the driving sprocket 51 of the drive chain 50. Further progress of the workholders causes them to become disengaged by the cam 53, whereupon their sprockets 49 drop into engagement with the driving chain 50.

The drive chain 50 is driven by a suitable source of power in timed relationship with the progress of the workholders through the machine. Hence, when the rotating work passes into contact with the cutting tool 14, I obtain a series of overlapping non-circular cuts on the surface of the work, until for all practical purposes, a surface of revolutions has been effected. Such a method of obtaining a surface of revolutions is described and claimed in my copending application for Letters Patent, Serial No. 641,652, and hence the reference may be had to such application for a more detailed description of the relative speed of travel of the workholder and of rotation of the work for accomplishing such a cutting action.

If the work is rotated so that its surface moves toward the cutting teeth, the resulting cut will be convex and the resulting cutting speed will have been increased. Inasmuch as I prefer each tooth to take a comparatively thin cut from the surface of the work, the cutting speed will be substantially the sum of the linear and rotative surface speeds of the work. On the other hand, if I rotate the work surface in a direction opposite to the direction of linear travel, the resulting cut will be concave and the resulting cutting speed will have been decreased, and for light cuts will be substantially the difference between the two speeds. Hence, it will be seen that regardless of the direction of rotation of the work, the cutting speed will be different during the period in which the work rotates than it is during the period in which the work is non-rotative. It will be apparent to those skilled in the art that the broach teeth may be spaced to provide overlapping cuts while the work is rotating and may be differently spaced while the work is non-rotating.

The first cutting group of teeth 14a, of the tool 14, to engage the work are stepped, while the next series of 14b are non-stepped, the former being roughing teeth and the latter being finishing teeth. Such cutting tool may have its teeth extend in a direction normal to the length of the tool or broach and parallel with the axis of the work, or at an angle to the axis of the work, as is well known in the art, and hence will not be described in detail here.

The broach bar or tool 14, for a short distance following the teeth 14b is devoid of teeth, such portion of the bar indicated at 14c, Fig. 5. While the workholders are beneath this last-named portion of the broach bar, the rotation of the work is stopped and the work positioned with the preformed flat surface C uppermost, whereupon it is gripped by a pair of clamping tools which securely clamp it in such position and retain it against rotation relative to the workholder.

As the driving sprockets 49 of the workholders progress beyond the reach of the driving chain 50, the cams 43 of the workholder are engaged by cam bars 55 which are secured to the frame of the machine. The foremost ends of these cam bars are sloped to engage the workholder cams 43 in a manner as indicated at 56 on Fig. 5, similar to the cam bars 44, heretofore described. Thus, before the chuck stems 40 are withdrawn, to disengage the chucks from the work, they are rotated, due to the action of the cam surface 56 with the workholder cams 43.

As heretofore mentioned, in connection with the action of the cam bar 44 on the cams 43, this accurately positions the flat surfaces of chucks, and hence the work W, relative to the axis of the work, that is, parallel with the broach or cutting bar, and uppermost in the workholder. Thereafter, continued progress of the workholder causes the cam surfaces 43 and 55 to coact to withdraw the chucks 36 from contact with the work and maintain them out of contact until the work is discharged from the workholder, as hereinafter more fully described.

Before the chucks are withdrawn from engagement with the work, and after rotation of the work has ceased, the workpiece is clamped against rotation so that straight-line cuts may be effected.

The mechanism for effecting the clamping of the work is illustrated in Figs. 6 and 7, and as there shown comprises a fixed clamp member 60, secured in any suitable way to the workholder, together with a movable clamp 61 slidably mounted for movement toward the work in a suitable guideway 62, formed in the workholder. The clamp 62 is normally retained in contact with a wedge bar 63, by suitable compression springs 64, disposed between the clamp and the stationary part of the workholder frame. The wedge bar 63 is slidably mounted in the workholder for movement in a direction transverse to the direction of movement in the workholder.

When the workholder approaches the position indicated by the workholder 12c, in Fig. 5, the projecting end 66 of the wedge bar is contacted by a suitable cam 67, which forces it toward the workholder, thus causing the wedge portion 63 of the bar to bring the clamp 61 into contact with the work, causing it to be gripped between the two clamp members 60 and 61. The cam 67 is pivotally mounted at 68 in the frame of the machine, and is normally urged toward the workholder by a comparatively heavy compression spring 69, which acts on a plunger 70, contacting with the cam 67 and as illustrated in Fig. 6.

During the initial part of the movement of the workholder, both the wedge bar 63 and the plunger are moved away from each other, the former causing the work to be gripped and the latter causing the spring 69 to be compressed. Continued movement of the workholder causes a surface 71 of the cam bar to slide off from the cam 67, whereupon the spring 69 forces the end of the cam into contact with a retracted surface 72 of the wedge bar, imparting a hammer-like blow to the bar, thereby positively clamping the work against movement in the workholder. A more detailed description of this type of work clamping mechanism may be had by reference to Patent No. 2,025,070, of Edgar E. Nygren, issued to my assignee, Foote-Burt Company, on the 24th day of December, 1935, and in which such mechanism is described, illustrated and claimed.

After the work has been clamped, the continued progress of the workholder brings the work into contact with a series of stepped cutting teeth 14d. The clamps 60 and 61 restrain the work against rotation. Hence, these teeth face the flat surface C of the work. Further movement of the workholder advances the workpiece into contact with a series of non-stepped teeth or finishing teeth 14e, (Fig. 3).

The continued movement of the workholder, after the work has passed from beneath the broach bar 14, brings the left-hand end of the wedge bar 63 into contact with a cam 80, carried by the machine frame 10, driving the wedge bar to the right, Fig. 9, whereupon the spring 64 retracts the clamping block 61, releasing the work. Consequent upon the swinging of the workholder, about the sprocket 17, the workpiece falls out of the workholder into a tray of the machine frame, from which it may be removed in any well-known manner.

It will become apparent to those skilled in the art that my novel method is adaptable to a number of various operations wherein it is desired to effect a turning and straight-line cut on a piece of work in an economical manner, and with a continuous movement of the work. It will also be apparent that these methods might be adapted for effecting the formation of drill holes or bores on a piece of work, as well as external operation hereinbefore described.

I claim:

1. The method of machining a metallic piece of work, having turned and flat surfaces comprising linearly moving the work past a fixed cutting tool while effecting a rotating movement of the work, and in the same linear movement of the work causing the work to be non-rotating while the work moves past the cutting edges of a second fixed cutting tool.

2. The method of machining metallic workpieces having flat and turned surfaces, comprising clamping the work against rotation, moving the clamped work linearly past a series of fixed cutting tools, and during part of the same linear movement of the work imparting a rotating movement to the work, and thereby effecting both turned and flat surfaces on the workpiece.

3. The method of machining metallic pieces of work, having a surface of rotation intersected by a flat surface parallel with the axis of rotation, comprising rotating the work while moving it past a fixed broaching tool to effect the finishing of the surfaces of revolution and during the same linear movement finishing the flat surfaces by moving the work linearly past a broaching tool while maintaining the work non-rotative.

4. The method of machining a piece of metallic work, requiring a plurality of different machining operations, comprising effecting said machining operations by linearly moving the piece of work past the cutting edges of differently shaped cutting tools in one continuous operation, including the step of rotating the work while the work is passing one of the tools and restraining the work against rotation while in passing another one of said tools.

5. The method of machining a metallic piece of work having flat and turned relatively precisioned surfaces, comprising flat broaching said surfaces by moving the work linearly past a fixed open faced broaching tool having multiple cutting edges while maintaining the work non-rotative, and in the same linear movement of the work, rotating the work while moving the work past a second open faced broaching tool to effect the finished turned surfaces upon the work, which will be in precision relationship to the flat surfaces thereof.

6. The method of machining a metallic workpiece having turned and flat surfaces, comprising positioning the workpiece in a fixture with the flat surface thereof in a predetermined position relative to the fixture, linearly moving the fixture past a fixed cutting tool while effecting a relative rotating movement between the work and the tool, stopping the rotative movement of the work and bringing the flat surface thereof into the same predetermined position relative to the fixture without interrupting the linear movement of the work securing the work against rotation while continuing the linear movement past the cutting edge of a second cutting tool.

7. The method of machining a metallic workpiece comprising moving the work bodily at a constant uninterrupted speed past a series of fixed cutting teeth, and causing the cutting speed relationship between the fixed tool and the constantly moving work to be greater while the work is in contact with the teeth of one group of such cutting teeth than the cutting speed relationship between the work and the fixed tool while the work is in contact with the teeth of another group of such cutting teeth.

BERNARD P. SCHILTZ.